US008621029B1

(12) United States Patent
Grier et al.

(10) Patent No.: US 8,621,029 B1
(45) Date of Patent: Dec. 31, 2013

(54) SYSTEM AND METHOD FOR PROVIDING REMOTE DIRECT MEMORY ACCESS OVER A TRANSPORT MEDIUM THAT DOES NOT NATIVELY SUPPORT REMOTE DIRECT MEMORY ACCESS OPERATIONS

(75) Inventors: James R. Grier, Gronton, MA (US); Abhijeet Gole, Campbell, CA (US); David W. Mitchell, Portsmouth, NH (US); Jeffrey S. Kimmel, Chapel Hill, NC (US); Arthur F. Lent, Cambridge, MA (US)

(73) Assignee: NetApp, Inc., Sunnyvale, CA (US)

( * ) Notice: Subject to any disclaimer, the term of this patent is extended or adjusted under 35 U.S.C. 154(b) by 2218 days.

(21) Appl. No.: 10/833,405

(22) Filed: Apr. 28, 2004

(51) Int. Cl.
  *G06F 15/167* (2006.01)
(52) U.S. Cl.
  USPC .......................................................... 709/212
(58) Field of Classification Search
  USPC ................................................ 709/212, 231
  See application file for complete search history.

(56) References Cited

U.S. PATENT DOCUMENTS

| | | | |
|---|---|---|---|
| 4,937,763 A | 6/1990 | Mott | |
| 5,067,099 A | 11/1991 | McCown et al. | |
| 5,157,663 A | 10/1992 | Major et al. | |
| 5,633,999 A | 5/1997 | Clowes et al. | |
| 5,781,770 A | 7/1998 | Byers et al. | |
| 5,812,748 A | 9/1998 | Ohran et al. | |
| 5,812,751 A | 9/1998 | Ekrot et al. | |
| 5,819,292 A | 10/1998 | Hitz et al. | |
| 5,951,695 A | 9/1999 | Kolovson | |
| 6,119,244 A | 9/2000 | Schoenthal et al. | |
| 6,292,905 B1 | 9/2001 | Wallach et al. | |
| 6,421,742 B1 * | 7/2002 | Tillier | 710/1 |
| 6,493,343 B1 * | 12/2002 | Garcia et al. | 370/394 |
| 6,625,749 B1 | 9/2003 | Quach | |
| 6,715,098 B2 * | 3/2004 | Chen et al. | 714/3 |
| 6,728,897 B1 | 4/2004 | Cramer et al. | |
| 6,760,304 B2 | 7/2004 | Uzrad-Nali et al. | |
| 7,293,195 B1 * | 11/2007 | Watanabe et al. | 714/9 |
| 7,346,702 B2 * | 3/2008 | Haviv | 709/238 |
| 7,376,755 B2 * | 5/2008 | Pandya | 709/250 |
| 2002/0055993 A1 * | 5/2002 | Shah et al. | 709/223 |
| 2003/0105931 A1 * | 6/2003 | Weber et al. | 711/162 |
| 2003/0115350 A1 | 6/2003 | Uzrad-Nali et al. | |
| 2003/0145045 A1 * | 7/2003 | Pellegrino et al. | 709/203 |
| 2004/0030668 A1 * | 2/2004 | Pawlowski et al. | 707/1 |
| 2004/0064815 A1 | 4/2004 | Uzrad-Nali et al. | |
| 2004/0156393 A1 | 8/2004 | Gupta et al. | |
| 2004/0268017 A1 | 12/2004 | Uzrad-Nali et al. | |
| 2005/0114593 A1 * | 5/2005 | Cassell et al. | 711/114 |

OTHER PUBLICATIONS

Massimi Bertozzi, An MPI Implementation on the Top of the Virtual Interface Architecture, Sep. 1999, Lecture Notes in Computer Science, vol. 1697, pp. 199-206.*
Dave Dunning, The Virtual Interface Architecture, 1998, IEEE, pp. 66-76.*
Gole et al., "Efficient Use of NVRAM During Takeover in a Node Cluster", U.S. Appl. No. 10/011,844, filed Dec. 4, 2001, 34 pages.

* cited by examiner

*Primary Examiner* — Krista Zele
*Assistant Examiner* — Esther Benoit
(74) *Attorney, Agent, or Firm* — Cesari and McKenna, LLP (57) ABSTRACT

A system and method provides a remote direct memory access over a transport medium that does not natively support remote direct memory access operations. An emulated VI module of a storage operating system emulates RDMA operations over such a medium, e.g., conventional Ethernet, thereby enabling storage. Storage appliances in a cluster configuration utilize the non-RDMA compatible transport medium as a cluster interconnect.

35 Claims, 9 Drawing Sheets

| | |
|---|---|
| DESTINATION ADDRESS | 705 |
| SOURCE ADDRESS | 710 |
| PROTOCOL | 715 |
| CONTROL | 720 |
| VERSION | 725 |
| VI HANDLE | 730 |
| ACK SEQUENCE | 735 |
| I DATA | 740 |
| MEMORY HANDLE | 745 |
| USER POINTER | 750 |
| OFFSET | 755 |
| LENGTH | 760 |
| SEQUENCE | 765 |

SYSTEM AND METHOD FOR PROVIDING REMOTE DIRECT MEMORY ACCESS OVER A TRANSPORT MEDIUM THAT DOES NOT NATIVELY SUPPORT REMOTE DIRECT MEMORY ACCESS OPERATIONS

FIELD OF THE INVENTION

The present invention relates to clustered storage systems and, in particular, to providing remote direct memory access (RDMA) functionality over a transport medium that does not natively support RDMA operations between storage systems in a storage system cluster.

BACKGROUND OF THE INVENTION

A storage system is a computer that provides storage service relating to the organization of information on writeable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of semantic level of access to files and file systems. Storage of information on a NAS system is typically deployed over a computer network comprising a geographically distributed collection of interconnected communication links, such as Ethernet, that allow clients to remotely access the information (files) on the file server. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC (FCP) or TCP/IP/Ethernet (iSCSI). A SAN arrangement or deployment allows decoupling of storage from the storage system, such as an application server, and some level of storage sharing at the application server level. There are, however, environments wherein a SAN is dedicated to a single server.

It is advantageous for the services and data provided by a storage system to be available for access to the greatest degree possible. Accordingly, some computer systems provide a plurality of storage systems organized as nodes of a cluster, with a property that when a first storage system fails, a second storage system is available to take over and provide the services and the data otherwise served by the first storage system. In particular, when the first storage system fails, the second storage system in the cluster assumes the tasks of processing and handling any data access requests normally processed by the first storage system. One such example of a cluster configuration is described in U.S. patent application Ser. No. 09/625,234 entitled NEGOTIATING TAKEOVER IN HIGH AVAILABILITY CLUSTER by Samuel M. Cramer, et al., now issued as U.S. Pat. No. 6,728,897 on Apr. 27, 2004.

In a typical cluster environment, the various storage systems are interconnected by one or more cluster interconnects that are typically implemented using Virtual Interface (VI) layered on Fibre Channel (FC-VI) over a physical FC transport medium. Virtual Interfaces are further described in Virtual Interface Architecture Specification, Version 1.0 by Compaq Computer Corp. et al., the contents of which are hereby incorporated by reference. A cluster interconnect is illustratively a direct network connection linking two or more storage systems in a cluster environment. The storage systems utilize the VI protocol, including its native remote direct memory access (RDMA) capabilities, during normal cluster operation over the cluster interconnect. By "native" it is meant that the transport protocol, e.g., FC-VI, supports the desired functionality, e.g., RDMA, without modifications.

However, in certain storage systems, a FC-VI connection, or other RDMA compatible protocol such as InfiniBand, is not available for use as a cluster interconnect. For example, a storage system designed to operate in an iSCSI-only environment may have only conventional Ethernet adapters. Alternately, the high cost of FC-VI controllers, including HBAs, may limit their inclusion in certain low-cost storage systems. This lack of a FC-VI connection limits the storage system's ability to perform RDMA operations over the cluster interconnect, with a concomitant loss of performance. Additionally, in some implementations, the conventional FC-VI hardware is not natively implemented although other forms of FC are supported. In such implementations, SCSI encapsulated in FC (FCP) may be supported; however, FCP does not support RDMA operations.

In cluster configurations that do not include a FC-VI HBA or a similar RDMA compatible cluster interconnect, the storage systems in a cluster configuration utilize non-RDMA data transfers over the cluster interconnect. This causes an increase in demand on the main processor of each storage system, thereby reducing processing capability available for handing data access commands. This reduction in processing capability is especially noticeable in lower cost storage systems that incorporate less powerful processors. Data access commands that are received at one storage system in a cluster are typically copied over the cluster interconnect to a partner storage system. Without RDMA capabilities, the storage system "wastes" processing power performing copy operations, while suffering from increased overhead of encapsulating the data into a higher-level protocol, such as TCP/IP. Additionally, other modules of a storage operating system executing on the storage system may need to be reconfigured to support non-RDMA interfaces.

SUMMARY OF THE INVENTION

The present invention overcomes the disadvantages of the prior art by providing RDMA operations over a transport medium that does not natively support RDMA operations. A modified eMulated Virtual Interface Adapter (MVIA) module of a storage operating system executing on each storage system of a cluster emulates RDMA functionality over such a transport medium, as conventional Ethernet. The MVIA module of the storm age operating system manages a RDMA and VI interface so that higher-level modules of the storage operating system appear to be utilizing a conventional VI interface. The MVIA module implements a required VI command set over the transport medium, including storage system specific packets that are utilized during failover/takover operations.

In the illustrative embodiment, the MVIA module is interspersed between an application program interface (API) layer that supports RDMA semantics, such as a VI NIC API of a virtual VI NIC and the device driver for the physical transport medium. This arrangement enables emulation of VI protocol by, for example, creating appropriate "over the wire" packets for transmission by the device driver in a manner that implements the RDMA operations without the overhead of higher level protocols. The MVIA module permits the higher-level modules of the storage operating system to utilize the same VI interface and API function calls as if those modules were communicating over a transport medium that natively supported RDMA operations. Thus, the emulated aspect of the VI protocol is transparent to higher-level modules, such as a cluster failover layer of the storage operating system.

The MVIA module also implements reliable reception (RR) that guarantees that a completion of a write operation issues at a source operation system only when the data has been delivered to an appropriate memory location at a destination storage system. RR also ensures that data is delivered to the destination in order, intact and exactly once. Upon detecting an error or an "out-of-sequence" packet, the destination ceases processing received packets until the source resends the erroneous or missing packet. The RR guarantees are important for NVRAM mirroring operations in a cluster environment to ensure that data is properly received at the destination.

BRIEF DESCRIPTION OF THE DRAWINGS

The above and further advantages of the invention may be understood by referring to the following description in conjunction with the accompanying drawings in which like reference numerals indicate identical or functionally similar elements.

DETAILED DESCRIPTION OF ILLUSTRATIVE EMBODIMENTS

A. Cluster Environment

Figure 1:
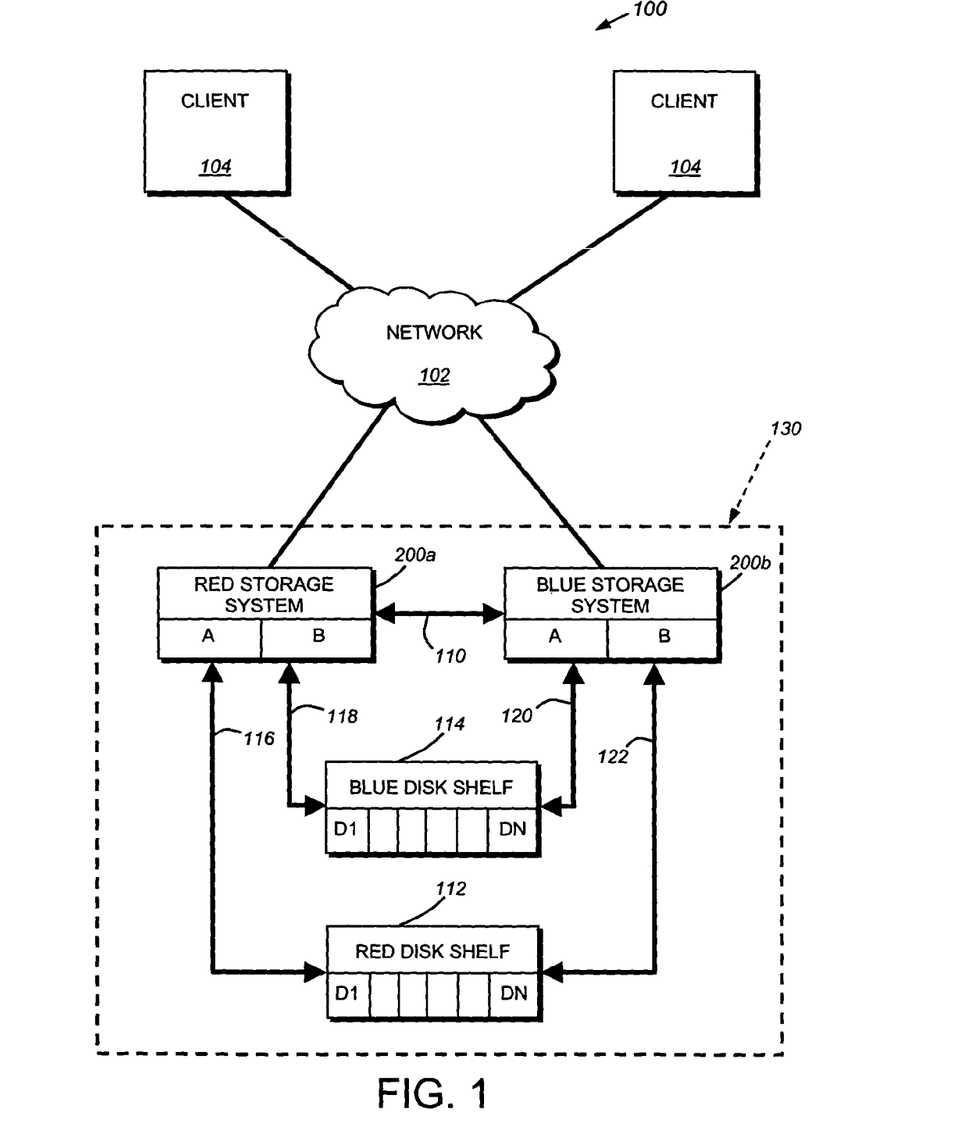
FIG. 1 is a schematic block diagram of an exemplary network environment having storage systems in a storage system cluster in accordance with an embodiment of the present invention.

FIG. 1 is a schematic block diagram of an exemplary network environment 100 in which the principles of the present invention may be implemented. A network 102 may comprise point-to-point links, wide area networks (WAN), virtual private networks (VPN) implemented over a public network (Internet), a shared local area network (LAN) and/or any other acceptable networking architecture. The network may comprise a FC switching network or a TCP/IP network. In alternate embodiments there may exist multiple networks 102 including, e.g., FC switching networks and/or TCP/IP networks. Attached to the network 102 are clients 104 and various storage systems, such as Red storage system 200a and Blue storage system 200b.

A client 104 may be a general-purpose computer, e.g., a PC, a workstation or a special-purpose computer, e.g., an application server, configured to execute applications over a variety of operating systems, including the UNIX® and Microsoft® Windows™ operating systems that support block access protocols. Red storage system 200a and Blue storage system 200b are connected as two nodes of an exemplary storage system cluster 130. These storage systems, described further below, are illustratively storage appliances configured to control storage of and access to interconnected storage devices. Each system attached to the network cloud 102 includes an appropriate conventional network interface arrangement (not shown) for communicating over the network 102 or through the switches 106 and 108.

In the illustrated example, Red storage system is connected to Red Disk Shelf 112 by data access loop 116 (i.e., Red Disk Shelf's A port). It should be noted that such a data access loop can be any acceptable networking media including, for example, a Fibre Channel Arbitrated Loop (FC-AL). Similarly, the Red storage system accesses Blue Disk Shelf 114 via counterpart data access loop 118 (i.e., Blue Disk Shelf's B port). Likewise, Blue storage system accesses Blue Disk Shelf 114 via data access loop 120 (i.e., Blue Disk Shelf's A port) and Red Disk Shelf 112 through counterpart data access loop 122 (i.e., Red Disk Shelf's B port). It should be further noted that the Red and Blue disk shelves are shown directly connected to storage systems 200 for illustrative purposes only. That is, the disk shelves and storage systems may be operatively interconnected via any suitable FC switching network topology. During normal cluster operation, the storage system that is connected to a disk shelf via the disk shelf's A loop is the "owner" of the disk shelf and is primarily responsible for servicing requests directed to blocks on volumes contained on that disk shelf. Thus, the Red storage system owns Red Disk Shelf 112 and is primarily responsible for servicing data access requests for data contained on that disk shelf. Similarly, the Blue storage system is primarily responsible for the Blue disk shelf 114. When operating as a cluster, each storage system is configured to take over and assume data handling capabilities for the other disk shelf in the cluster 130 via the disk shelf's B port.

Connecting the Red and Blue storage systems is a cluster interconnect 110, which provides a direct communication link between the two storage systems. Additionally, in alternate embodiments, multiple cluster interconnects may link the storage systems of a storage system cluster. In accordance with the illustrative embodiment of the present invention, one or more of the cluster interconnects comprises a transport medium that does not natively support RDMA operations, such as, for example, an Ethernet connection.

B. Storage Appliance

Figure 2:
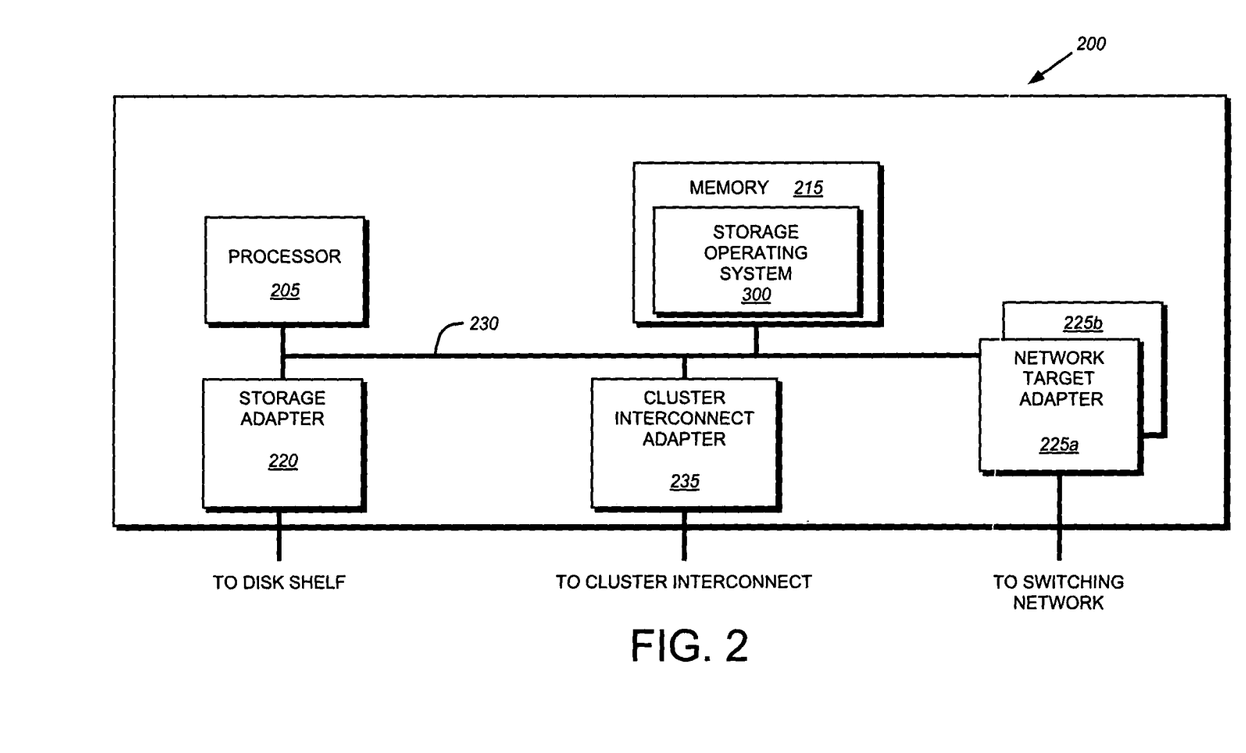
FIG. 2 is a schematic block diagram of an exemplary storage system in accordance with an embodiment of the present invention.

FIG. 2 is a schematic block diagram of an exemplary storage system 200 used in the cluster network environment 100 and configured to provide storage service relating to the organization of information on storage devices, such as disks. The storage system 200 is illustratively embodied as a storage appliance comprising one or more processors 205, a memory 215, a plurality of network adapters 225a, 225b and a storage adapter 220 interconnected by a system bus 230. The terms "storage system" and "storage appliance" are used interchangeably herein. The storage appliance 200 also includes a storage operating system 300 that logically organizes the information as a hierarchical structure of directories, files and virtual disks (vdisks) on the disks.

In the illustrative embodiment, the memory 215 comprises storage locations that are addressable by the processor and adapters for storing software program code and data structures associated with the present invention. The processor and adapters may, in turn, comprise processing elements and/or logic circuitry configured to execute the software code and manipulate the data structures. A storage operating system 300, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the inventive system and method described herein.

Each network adapter 225a, b may comprise a network interface card (NIC) having the mechanical, electrical, and signaling circuitry needed to couple the storage appliance to the network 102. Each NIC may include an interface that is assigned one or more IP addresses along with one or more media access control (MAC) addresses. The clients 104 communicate with the storage appliance by sending packet requests for information to these addresses in accordance with a predefined protocol, such as TCP/IP.

The storage adapter 220 cooperates with the storage operating system 300 executing on the storage appliance to access information requested by the clients 104. The information may be stored on the disks or other similar media adapted to store information. The storage adapter includes input/output (I/O) interface circuitry that couples to the disks over an I/O interconnect arrangement, such as a conventional high-performance, FC serial link or loop topology. The information is retrieved by the storage adapter and, if necessary, processed by the processors 205 (or the adapter 220 itself) prior to being forwarded over the system bus 230 to the network adapters 225a and b, where the information is formatted into packets and returned to the clients.

Storage of information on the storage appliance 200 is, in the illustrative embodiment, implemented as one or more storage volumes that comprise a cluster of physical storage disks, defining an overall logical arrangement of disk space. The disks within a volume are typically operated as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume is constructed from an array of physical disks that are organized as RAID groups. The physical disks of each RAID group include those disks configured to store striped data and parity for the data, in accordance with an illustrative RAID 4 level configuration. However, other RAID level configurations (e.g. RAID 5) are also contemplated. In the illustrative embodiment, a minimum of one parity disk and one data disk may be employed. Yet, a typical implementation may include three data and one parity disk per RAID group and at least one RAID group per volume.

To facilitate access to the disks, the storage operating system 300 implements a write-anywhere file system that logically organizes the information as a hierarchical structure of directory, file and vdisk objects (hereinafter "directories", "files" and "vdisks") on the disks. A vdisk is a special file type that is translated into an emulated disk or logical unit number (lun) as viewed by a storage area network (SAN) client. Each "on-disk" file may be implemented as set of disk blocks configured to store information, such as data, whereas the directory may be implemented as a specially formatted file in which names and links to other files and directories are stored.

The storage appliance also includes a cluster interconnect adapter 235 that provides a specific network interface to a cluster partner of the storage system for various partner-to-partner communications and applications. The cluster interconnect adapter 235 is illustratively an Ethernet network interface. In alternate embodiments, the cluster interconnect adapter may utilize another transport medium that does not natively support RDMA operations, such as FC without being layered with FC-VI or FCP. In the example of a cluster interconnect utilizing FCP, the SCSI transport protocol supports semantics for high-speed zero-copy bulk data transfer but does not natively support RDMA semantics.

C. Storage Operating System

In the illustrative embodiment, the storage operating system is the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system, including a write in-place file system, may be enhanced for use in accordance with the inventive principles described herein. As such, where the term ONTAP is employed, it should be taken broadly to refer to any storage operating system that is otherwise adaptable to the teachings of this invention.

As used herein, the term "storage operating system" generally refers to the computer-executable code operable on a computer that manages data access and may, in the case of a storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 3:
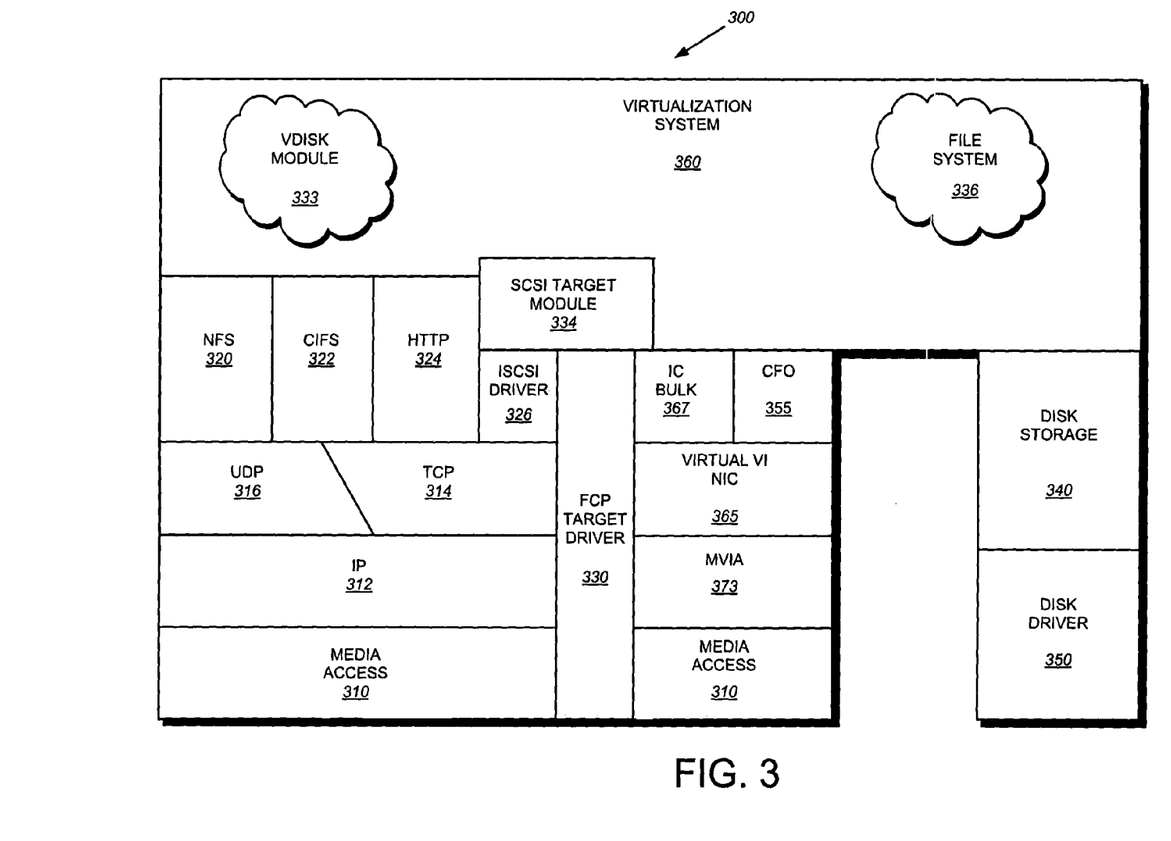
FIG. 3 is a schematic block diagram of an exemplary storage operating system executing on a storage system for use in accordance with an embodiment of the present invention.

FIG. 3 is a schematic block diagram of a storage operating system 300 that implements the present invention. The storage operating system comprises a series of software layers organized to form an integrated network protocol stack or, more generally, a multi-protocol engine that provides data paths for clients to access information stored on the storage appliance using block and file access protocols. The protocol stack includes a media access layer 310 of network drivers (e.g., gigabit Ethernet drivers) that interfaces to network protocol layers, such as the IP layer 312 and its supporting transport mechanisms, the TCP layer 314 and the User Datagram Protocol (UDP) layer 316. A file system protocol layer provides multi-protocol file access and, to that end, includes support for the NFS protocol 320, the CIFS protocol 322 and the Hypertext Transfer Protocol (HTTP) protocol 324.

An iSCSI driver layer 328 provides block protocol access over the TCP/IP network protocol layers, while a FCP target driver layer 330 operates with an FC HBA to receive and transmit block access requests and responses to and from the integrated storage appliance. The FCP and iSCSI target drivers provide FC-specific and iSCSI-specific access control to the luns (vdisks) and, thus, manage exports of vdisks to either iSCSI or FCP or, alternatively, to both iSCSI and FCP when accessing a single vdisk on the storage appliance. FCP and iSCSI are examples of SCSI transports that include support for zero copy bulk data transfers. In addition, the storage operating system includes a disk storage layer 340 that implements a disk storage protocol, such as a RAID protocol, and a disk driver layer 350 that implements a disk access protocol such as, e.g., a SCSI protocol.

Bridging the disk software layers with the integrated network protocol stack layers is a virtualization system 355 that is implemented by a file system 336 interacting with virtualization modules illustratively embodied as, e.g., vdisk module 333 and SCSI target module 334. It should be noted that the vdisk module 333, the file system and SCSI target module 334 can be implemented in software, hardware, firmware, or a combination thereof. The vdisk module 333 interacts with the file system 336 to enable access by administrative interfaces in response to a system administrator issuing commands to the multi-protocol storage appliance 300. In essence, the vdisk module 333 manages SAN deployments by, among other things, implementing a comprehensive set of vdisk (lun) commands issued through a user interface by a system administrator. These vdisk commands are converted to primitive file system operations ("primitives") that interact with the file system 333 and the SCSI target module 334 to implement the vdisks.

The SCSI target module 334, in turn, initiates emulation of a disk or lun by providing a mapping procedure that translates luns into the special vdisk file types. The SCSI target module is illustratively disposed between the FC and iSCSI drivers 328, 330 and the file system 336 to thereby provide a translation layer of the virtualization system 360 between the SAN block (lun) space and the file system space, where luns are represented as vdisks.

The file system 336 is illustratively a message-based system; as such, the SCSI target module 334 transposes a SCSI request into a message representing an operation directed to the file system. For example, the message generated by the SCSI target module may include a type of operation (e.g., read, write) along with a pathname (e.g., a path descriptor) and a filename (e.g., a special filename) of the vdisk object represented in the file system. The SCSI target module 334 passes the message into the file system 336 as, e.g., a function call, where the operation is performed.

The file system 335 illustratively implements the WAFL file system having an on-disk format representation that is block-based using, e.g., 4 kilobyte (KB) blocks and using inodes to describe the files. The WAFL file system uses files to store metadata describing the layout of its file system; these metadata files include, among others, an inode file. A file handle, i.e., an identifier that includes an inode number, is used to retrieve an inode from disk. A description of the structure of the file system, including on-disk inodes and the inode file, is provided in U.S. Pat. No. 5,819,292, entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz, et al., the contents of which are hereby incorporated by reference.

The storage operating system 300 also includes an interconnect communication stack that comprises an interconnect bulk module 367, a virtual VI NIC 365, and an eMulated Virtual Interface Adapter (MVIA) module 373. The interconnect bulk module 367 provides flow control over the cluster interconnect 110. The virtual VI NIC 365 provides a software interface between upper level module of the storage operating system and the lower-level modules of the interconnect protocol stack, i.e. the virtual VI NIC 365 functions as an adapter driver to the interconnect protocol stack and specifically the MVIA module. The virtual VI NIC may include support for any RDMA or Direct Access Transport (DAT) API. Thus, in alternate embodiments, the virtual VI NIC may be replaced with, or supplemented with, other API modules such as a VI Provider Library (VIPL) or Direct Access Provider Library (DAPL). As such, the virtual VI NIC, VIPL or DAPL module may be generalized as an RDMA API module that implements semantics for a RDMA compatible protocol, such as FC-VI or InfiniBand.

The MVIA module, described further below, illustratively implements a modified M-VIA package that emulates RDMA semantics onto a protocol that lacks such semantics. The M-VIA (Modular VI Architecture) package is available from The National Energy Research of Scientific Computing Center at the Lawrence Berkeley Labs. While this description is written in terms of a modified MVIA package, it is expressly contemplated that other emulated protocols and/or systems may be utilized in accordance with the principles of the present invention. As such, the term "MVIA module" should be taken to mean any module implementing an RDMA capable protocol over a transport medium that does not natively support RDMA operations according to the teachings of the present invention.

In accordance with the illustrative embodiment, the MVIA module 373 directly interfaces with the media access layer 310 to enable the transmission/reception of the MVIA module generated packets over the appropriate transport medium. To that end, the MVIA module is modified to incorporate appropriate cluster configuration specific options including, for example, reliable reception and kill packets, described further below. For example, RDMA operations are originated by a cluster failover (CFO) module 355, which controls the failover of data access processing in the event of failure, or other high level module of the storage operating system and passed to the virtual VI NIC 365, which passes the operations to the MVIA module 373, which in turn, emulates the VI protocol and utilizes the media access layer 310 to transmit raw Ethernet packets over the cluster interconnect to the partner storage appliance.

One type of operation sent over the interconnect communication stack is NVRAM mirroring data, typically sent by a NVRAM mirroring process associated with the CFO. During normal operation, the storage operating system does not acknowledge receipt of a data access operation until the operation is committed to persistent storage, such as disk or NVRAM. This requirement prevents the loss of data in the event of an error or failure of the storage appliance and/or storage operating system. In a cluster configuration, the received operation is not acknowledge until the received operation is committed to persistent storage at each storage appliance in the cluster. As storage appliances typically store received operations in NVRAM until they are later written to disk, data written into a storage appliance's NVRAM must be mirrored to all other storage appliances in a cluster. NVRAM mirroring and its use in a cluster is further described in U.S. patent Ser. No. 10/011,844, entitled EFFICIENT USE OF NVRAM DURING A TAKEOVER IN A NODE CLUSTER, by Abhijeet Gole, et al. In the illustrative embodiment, the NVRAM mirroring data is sent to partner storage appliances via the interconnect communication stack.

D. Emulated RDMA Over a Transport Medium that does not Natively Support RDMA

In the illustrative embodiment, the cluster interconnect is implemented using a conventional Ethernet media access controller (MAC) directly coupled to Ethernet cabling linking the storage appliances as a cluster 130. The MVIA module 373 emulates the appropriate VI semantics over the Ethernet cabling between the clustered storage appliances. In the illustrative embodiment, the MVIA layer module implements a modified version of an emulated VI package with additional adaptations for clustering configurations. These adaptations include, inter alia, reliable reception and support for processing kill packets.

Figure 4:
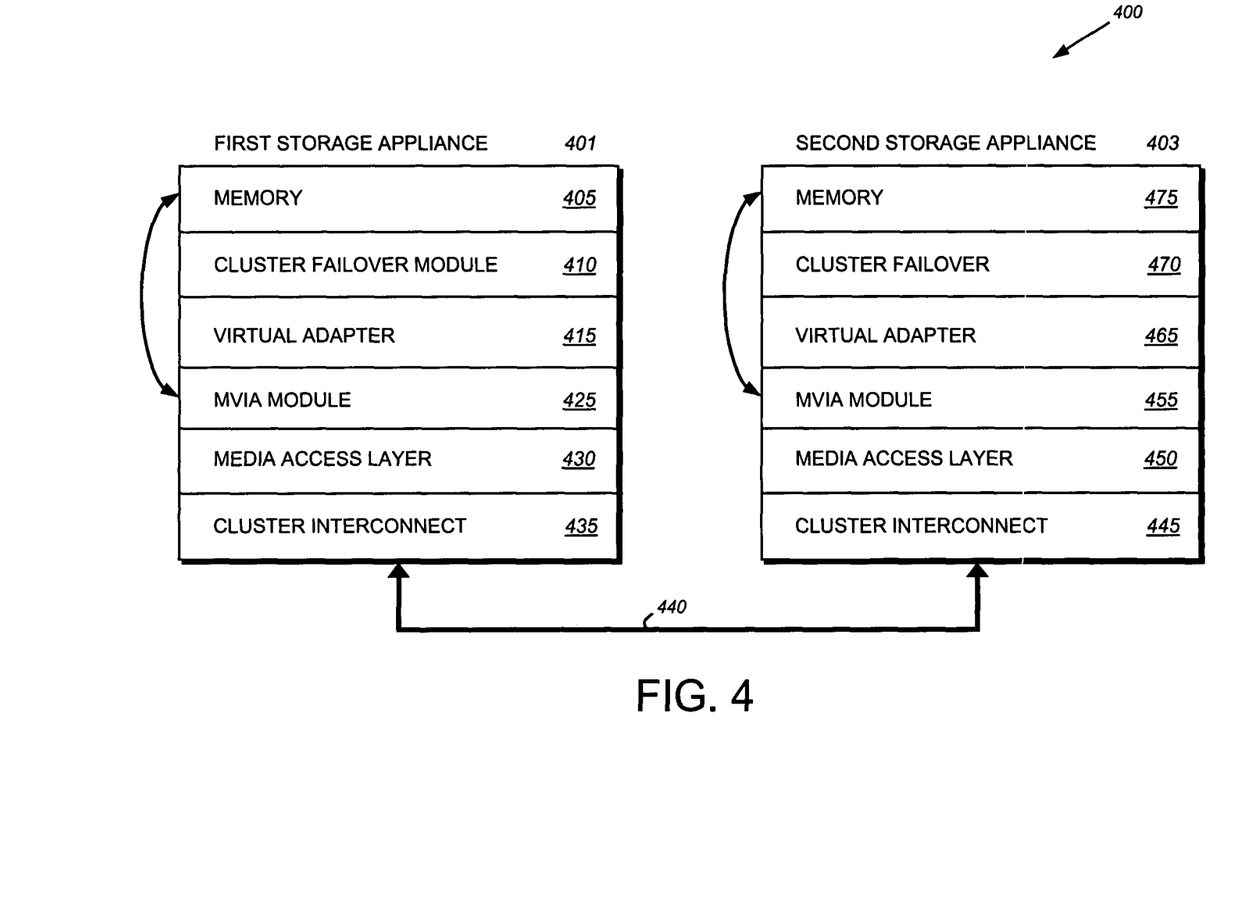
FIG. 4 is a schematic block diagram of an exemplary layer flow diagram in accordance with the embodiment of the present invention.

FIG. 4 is a schematic block diagram of various operating system modules and hardware components utilized in a first and second storage appliance when performing RDMA operations over a transport medium that does not natively support such RDMA operations in accordance with an illustrative embodiment of the present invention. In this example, a RDMA write operation is illustrated, however, the same principles apply to RDMA read operations. The data to be transferred originates in a memory 405 of the first storage appliance 401. A cluster failover module 410 passes a desired command, including appropriate address locations and links to the virtual VI NIC 415, which passes the command to MVIA module 425. The MVIA module 425 which generates the appropriate protocol (i.e., Ethernet) packets to send over the physical cluster interconnect transport medium. The MVIA module 425 sends the generated packets to the media access layer 430 which passes them to the physical cluster interconnect 435. In the illustrative embodiment, the cluster interconnect 435 comprises an Ethernet MAC that is connected to Ethernet cabling 440 linked to a cluster interconnect 445 on the second storage appliance 402.

The cluster interconnect 445 of the second storage appliance 402, e.g., an exemplary ethernet MAC, passes the received packets to a media access module 450 of the second storage appliance's storage operating system. The received packets are then passed to the MVIA module 455 of the second storage appliance for processing. Depending on the command received, i.e. a read or write operation, the MVIA module 455 may directly access the memory 475 of the second storage appliance. For example, if the MVIA module 455 receives an RDMA read request, the MVIA module may directly access the memory 475 to obtain the desired information to be transmitted over the interconnect 440. Alternately, the received command is passed from the MVIA module 455 to the virtual VI NIC 465 of the second storage appliance. The virtual VI NIC 465 permits a unified interface to high-level modules of the storage operating system including, for example, the cluster failover module 471. If, however, the MVIA module 455 receives a special packet, such as a cluster configuration specific kill packet, the MVIA module 455 performs the appropriate processing, described further below.

In effect, the MVIA module implements a protocol layer that maps an API with RDMA and/or DAT semantics onto a transport medium that lacks RDMA semantics. It should be noted that DAT is a generalized abstraction of RDMA semantics. In the illustrative embodiment, the API is a virtual VI NIC. However, it should be noted that in alternate embodiments, any RDMA or DAT API may be implemented, e.g., Virtual Interface Provider Library (VIPL) or Direct Access Provider Library (DAPL) and variants thereof, such as kVIPL, uDAPL, kDAPL, etc.

Figure 5:
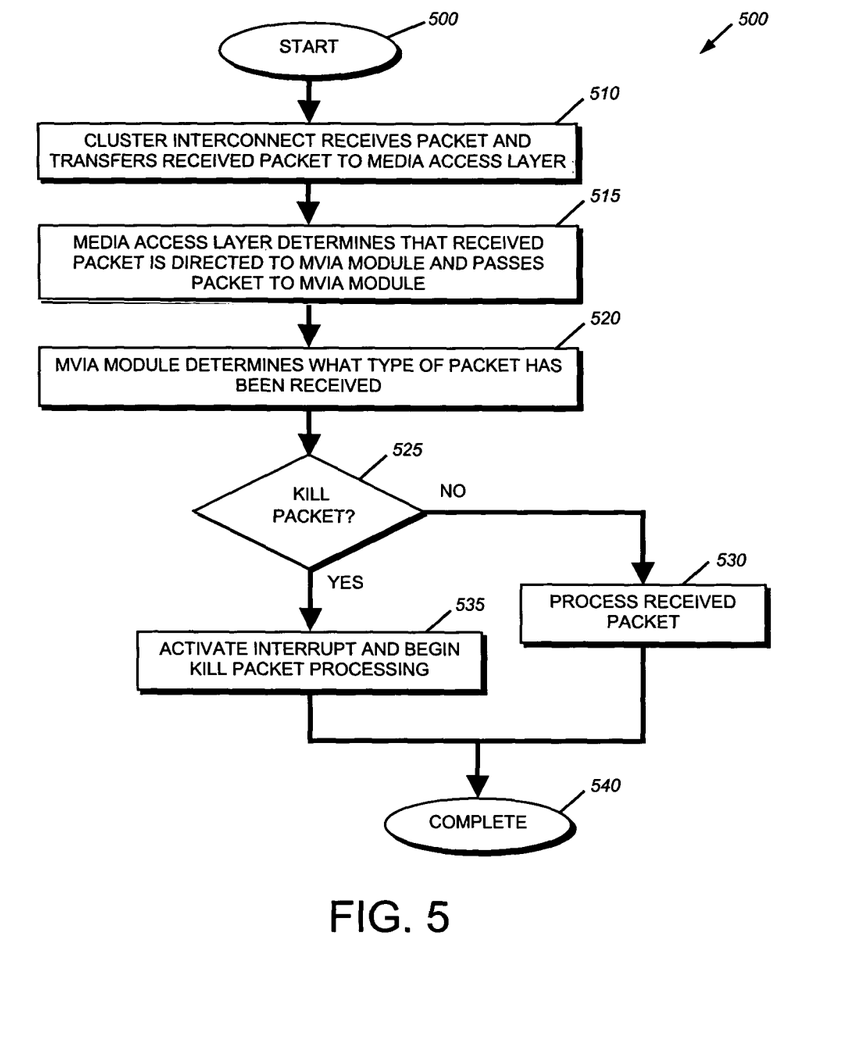
FIG. 5 is a flow chart detailing the steps of a procedure for processing a kill packet in accordance with the embodiment of the present invention.

FIG. 5 is a flowchart detailing the steps of a procedure 500 performed by a storage operating system when processing a kill packet in accordance with an illustrative embodiment of the present invention. The procedure begins in step 505 and continues to step 510 where the cluster interconnect receives a packet and transfers the received packet from a partner storage appliance to the media access layer of a storage operating system. In step 515, the media access layer determines if the received packet is directed to the MVIA module and passes the packet to that module. This determination may be made by, for example, detecting the MAC address to which the packet is directed. The MVIA module, in step 520 determines the type of packet that has been received. If it is not a kill packet (step 525), the procedure branches to step 530 where the packet is processed. Such processing may include, for example, executing a read or write operation or performing other command implemented within the VI protocol. Once the packet has been processed, the procedure then completes in step 540. However, if in step 525 the MVIA module determines the received packet is a kill packet, the procedure continues to step 535 and activates an interrupt on the processor to begin the kill packet processing. In accordance with the illustrative embodiment, the kill packet processing includes, inter alia, shutting down data access processing and reinitializing the storage appliance to a set configuration. The procedure then completes in step 540.

Additionally, in the illustrative embodiment, the MVIA module implements reliable reception (RR) in the emulated VI protocol. The implementation of RR is important for NVRAM mirroring operations in a cluster configuration. As a received data access operation is not acknowledged until the operation is persistently stored on all storage appliances in a cluster, it is important for a storage appliance that is mirroring its NVRAM to other appliances in a cluster to be guaranteed that data being sent is properly received at the destination. The VI architecture specification defines reliable delivery (RD) semantics that guarantee that all data submitted for transmission over a transport medium by a source, e.g., first storage appliance, will arrive at its destination in the order submitted, intact and exactly once. Under conventional RD semantics, a send operation or RDMA write operation is completed once the associated data has been successfully transmitted over the medium. Reliable reception (RR) provides similar guarantees with one difference being that a send or RDMA write operation is complete only when the data has been delivered to a memory location at the destination. To implement RR, the MVIA module assigns a unique sequence number to each packet. If the destination notices an error or a gap in sequence numbers, it is alerted that a packet has been lost. In such a case, the destination will send a not acknowledged (NACK) packet, described further below, to the source. The destination will also ignore further incoming packets until the source retransmits the packet with an appropriate sequence number, i.e., the sequence number that was missing or the sequence number where an error occurred.

Figure 6:
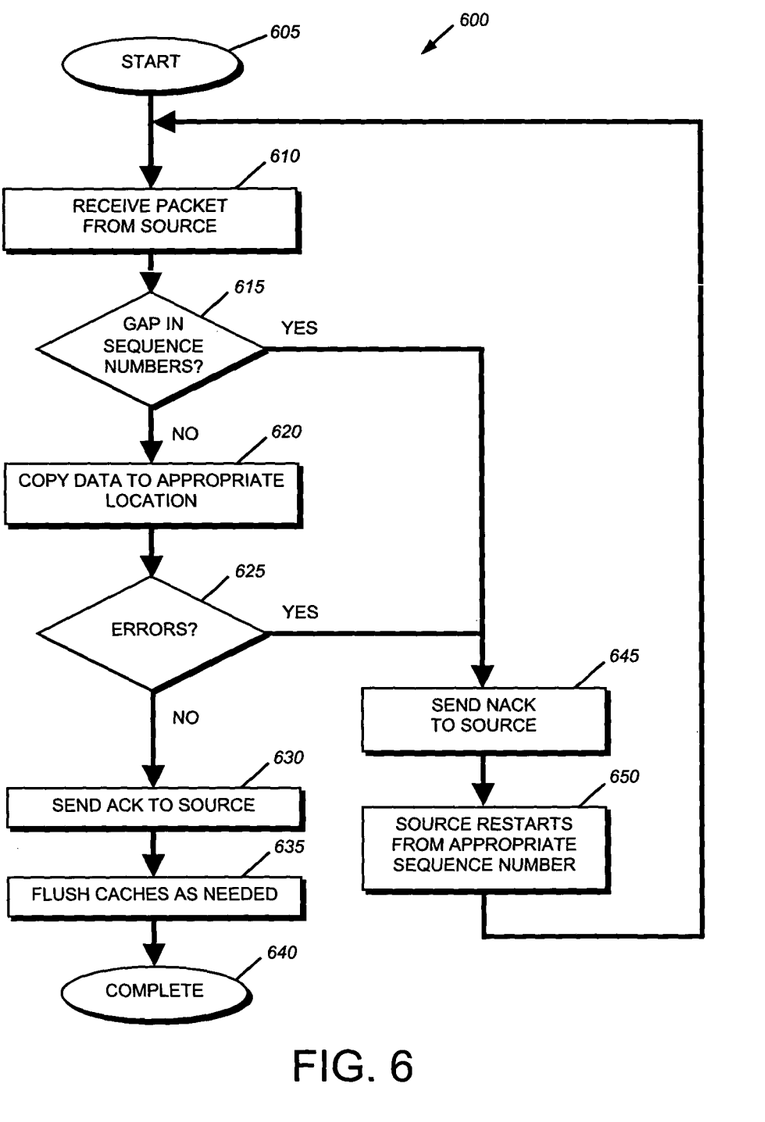
FIG. 6 is a flow chart detailing the steps of a procedure for implementing reliable reception in accordance with an embodiment of the present invention.

FIG. 6 is a flowchart detailing the steps of a procedure 600 performed by the MVIA module when implementing RR in accordance with an embodiment of the present invention. The procedure 600 begins in step 605 and continues to step 610 where the destination receives a packet from the source. This packet has a unique sequence number, which is checked at the destination in step 615 to ensure that there are no gaps in received sequence numbers at the destination. If there is not a gap, the procedure continues to step 620 where the destination copies the received data into the appropriate memory location. In step 625, a check is made to determine if any errors occurred while completing the copy operation. If no errors occurred, the procedure continues to step 630 where the destination sends an acknowledgement (ACK) packet to the source. Upon sending the ACK, the destination may flush memory any temporary locations as needed in step 635 before the procedure completes in step 640.

However, if there is a gap in sequence numbers (step 615) or an error (step 625), the procedure branches to step 645 where the destination sends a not acknowledged (NACK) packet to the source. Upon receipt of the NACK packet, the sender resends any unacknowledged packets beginning with the NACKed packet. Until the packet with the appropriate sequence number is received, the destination does not process any packets. This ensures that data is delivered in the proper order and only received once. By implementing RR over the cluster interconnect, the partner storage appliance, are assured of their cluster communications being delivered appropriately.

E. Emulated VI Protocol

The VI protocol is described in the above-incorporated Virtual Interface Architecture Specification Version 1.0. In accordance with the illustrate embodiment, the MVIA module of the operating system implements a modified version of the MVIA package as distributed by NERSC. The illustrative MVIA module protocol, which comprises the actual packets of data transmitted over the physical cluster interconnect transport medium, comprises three types of messages: data messages, control messages and acknowledgement (ACK) messages. It should be noted that the exemplary embodiment described herein references the implementation of the VI protocol over an Ethernet transport medium. However, it should be noted that the principles of the present invention may be implemented using any acceptable protocol that supports RDMA operations in conjunction with any suitable transport medium. As such, the MVIA module protocol described herein should be taken as exemplary only.

Figure 7:
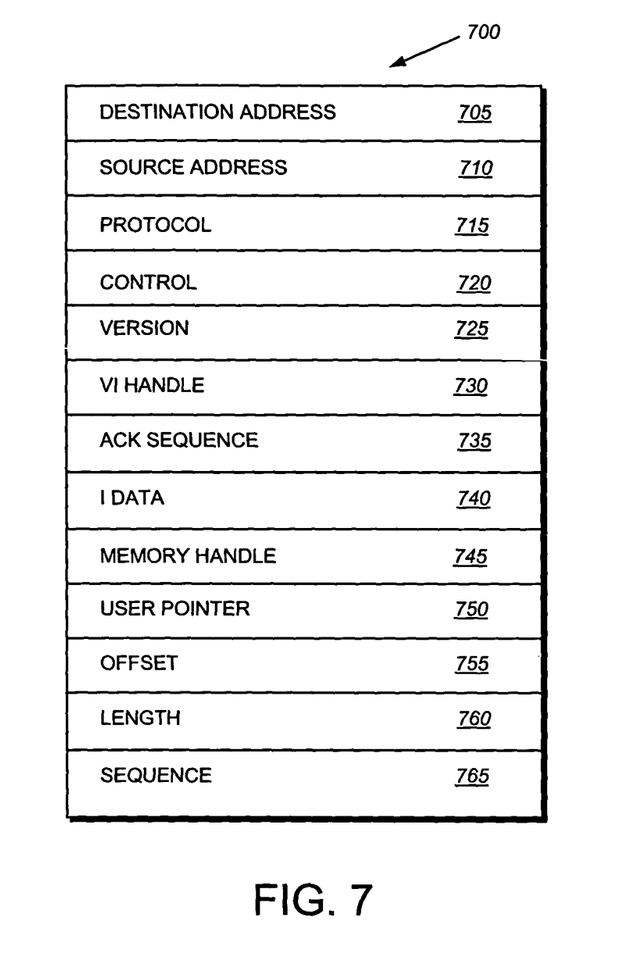
FIG. 7 is a schematic block diagram of an exemplary MVIA data packet in accordance with the embodiment of the present invention.

FIG. 7 is a schematic block diagram of an exemplary MVIA module protocol data packet 700. The data packet 700 includes a destination address field 705, a source address field 710, a protocol field 715, a control field 720, a version field 725, a VI handle field 730, and acknowledgement (ACK) sequence field 735 and idata field 740, a memory handle field 745, a user pointer field 750, an offset field 755, a length field 760 and a sequence field 765. In alternate embodiment, the data packet 700 may include additional fields and/or differing fields. It should be noted that the destination address field 705, source address field 710 and protocol field 715 exactly overlay those fields of a conventional Ethernet header. The destination address field 705 includes an Ethernet address of the intended destination of the data packet 700. The source address field 710 includes the Ethernet address of the source of the packet. The protocol field 715, which corresponds to the ether type field in a conventional Ethernet packet, is expanded to include a new protocol value (VIPK_ERING PROTOCOL), with defines the packet as an emulated VI packet.

The control field 620 identifies the type of packet by including one of three conventional values, namely SENDRECV, RDMAWRITE or RDMAREAD. The RDMAWRITE value identifies the data packet as an RDMA write operation. Similarly, the RDMAREAD value identifies the packet as an RDMA read operation. The SENDRECV value identifies the packet as a conventional, non-RDMA, operation. The control field may have additional bits set to identify that the data packet is the last fragment of data (LAST_FRAG) or the first fragment of a set of data (FIRST_FRAG). The LAST_FRAG and FIRST_FRAG values may be utilized when, for example, data is sent in multiple packets to signify the beginning and end of the data.

The version field 725 identifies the current version of the MVIA module, while the VI handle field 730 identifies the appropriate VI handle, defined by the VI specification, associated with this operation. The ACK sequence field 735 contains a value that indicates which message associated with the VI handle is to be acknowledged. The idata field 740 holds data being transferred via a non-RDMA operation. The memory handle field 745 and user pointer field 750 are utilized during RDMA operations to identify memory in the destination. The offset field 755 identifies an offset within the memory identified by the memory handle field 745. Similarly, the length field 760 identifies the length of the RDMA operation to be performed. The sequence field 765 includes a value for use in acknowledging receipt of the packet.

Figure 8:
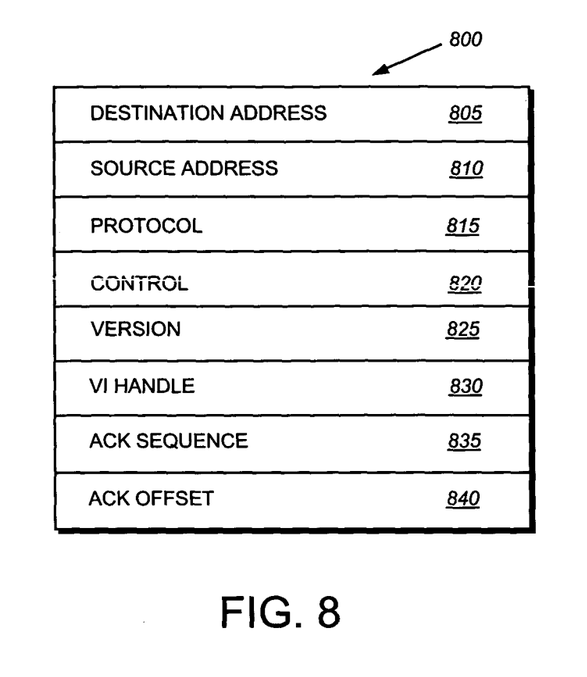
FIG. 8 is a schematic block diagram of an exemplary MVIA acknowledgement packet in accordance with an embodiment of the present invention.

FIG. 8 is a schematic block diagram of an exemplary acknowledgment (ACK) packet 800 in accordance with the embodiment of the present. The ACK packet 800 includes a destination address field 805, a source address field 810, a protocol field 815, a control field 820, a version field 825, a VI handle field 830, and an ACK sequence field 835 and an acknowledgement (ACK) offset field 840. The destination address, source address and protocol fields 805, 810, and 815 are identical to their respective counterparts in the data packet 700, described in detail above. The control field 820 includes several options that may be set including, an ACK option identifying the packet as an acknowledgment packet along with a not acknowledged (NACK) value and GACK value. If the ACK value is set in the control field 820, the packet is identified as an acknowledgment packet. If a NACK option is also set within the control field 820, the packet is identified as a not acknowledged packet and should be resent according to VI protocol. If the GACK value is set within the control field, the acknowledgment packet is identified as a kill packet, and the recipient storage appliance should perform the appropriate processing, as described above. The version field 825, VI handle field 830 and acknowledged sequence field 835 are identical to the similarly named fields discussed above in reference to the data packet 700. The ACK sequence field 835 is utilized to identify which data packet is being acknowledged by including the appropriate ACK sequence value from the appropriate data packet. The ACK offset field 840 identifies the number of bytes received. Thus, an acknowledgment packet may, by setting the acknowledgement offset field to an appropriate value, signify that a specific number of bytes were received and are being acknowledged by the packet.

Figure 9:
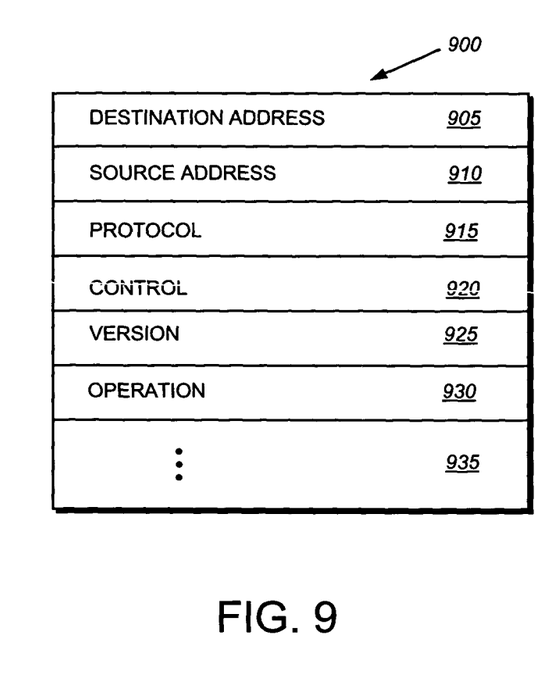
FIG. 9 is a schematic block diagram of an exemplary MVIA control packet in accordance with an embodiment of the present invention.

FIG. 9 is schematic block diagram of an exemplary control packet 900 in accordance with an illustrative embodiment of the present invention. The control packet 900 includes a destination address field 905, a source address field 910, a protocol field 915, a control field 920, a version field 925, an operation field 930 and, in alternate embodiments, addition fields 935. The destination address, source address, protocol, control and version fields 905-925 are identical to their respective fields described above with reference to a data packet 700. Note that a value may be set within the control field 920 identifying the packet as a control packet. The operation field 930 stores a value identifying the VI protocol operation to be performed. The operation may comprise any of the conventional operations described within the VI architecture.

As noted above, the MVIA module of the storage operating system generates the appropriate data, control and acknowledgment packets to be sent over the cluster interconnect in accordance with the illustrative embodiment of the present invention. The MVIA module similarly decodes the received packets and implements the desired commands by interfacing with other modules of the storage operating system.

To again summarize, the present invention is directed to a system and method for implementing RDMA operations over a transport medium that does not natively support RDMA operations, including, in the illustrative embodiment Ethernet. The MVIA module interfaces with the device driver for a cluster interconnect and higher-level modules of the storage operating system to emulate the VI protocol over the cluster interconnect transport medium and provide a transparent interface to other components of the storage operation system.

The foregoing description has been directed to particular embodiments of this invention. It will be apparent, however, that other variations and modifications may be made to the described embodiments, with the attainment of some or all of their advantages. While the illustrative embodiment has been written in terms of a virtual VI NIC and a MVIA module that implements VI over Ethernet, it should be noted that any RDMA API module may be utilized with the teachings of the present invention. It should be noted that alternative protocols, such as InfiniBand, or any other appropriate protocol may be employed using the teachings of the present invention. Additionally, the procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A storage system for use in a storage system cluster with a partner storage system, comprising:
    a processor and a memory;
    a network adapter of the storage system configured to be coupled to a transport medium that does not support remote direct memory access operations;
    a network driver of the storage system configured to control the network adapter; and
    an emulated protocol module, stored in the memory, operatively interconnected with the network driver configured to emulate a protocol supporting remote direct memory access operations, the emulated protocol module further configured to generate a protocol packet that is supported by the network adapter and the transport medium, wherein the protocol packet comprises the remote direct memory access operations, the emulated protocol module further configured to implement reliable reception of the packets over the transport medium.

2. The storage system of claim 1 wherein the transport medium comprises a SCSI transport that includes support for zero copy bulk data transfers.

3. The storage system of claim 2 wherein the SCSI transport comprises FCP.

4. The storage system of claim 2 wherein the SCSI transport comprises iSCSI.

5. The storage system of claim 1 wherein the transport medium comprises a cluster interconnect operatively connecting the storage system to the partner storage system.

6. The storage system of claim 1 wherein the network adapter comprises an Ethernet media access controller.

7. The storage system of claim 1 wherein the network driver comprises a media access layer of a storage operating system of the storage system.

8. The storage system of claim 1 wherein the protocol comprises a virtual interface protocol.

9. The storage system of claim 1 wherein the emulated protocol module implements a cluster specific modification to the protocol.

10. The storage system of claim 9 wherein the cluster specific modification comprises supporting a kill packet within the protocol.

11. The storage system of claim 1 wherein the emulated protocol module is further configured to detect a missing sequence number of a set of sequence numbers assigned to the packets, the emulated protocol module further configured to, in response to detecting the missing sequence number, respond with a NACK message and ignore packets received over the transport medium until a received packet contains the missing sequence number.

12. The storage system of claim 1 wherein the emulated protocol module is integrated with high layer modules of a storage operating system of the storage system so that emulation of the protocol is transparent to the high layer modules of the storage operating system.

13. A storage system cluster, comprising:
    a processor and a memory;
    a first storage system comprising a network adapter operatively connected to a transport medium that does not support remote direct memory access operations;
    a second storage system operatively connected to the first storage system via the transport medium, wherein the second storage system is a partner to the first storage system; and
    the first storage system comprising an emulated protocol module configured to emulate a protocol supporting remote direct memory access operations, the emulated protocol module further configured to generate a protocol packet that is supported by the network adapter and the transport medium, wherein the protocol packet comprises the remote direct memory access operations and wherein the emulated protocol module is further configured to implement reliable reception of the packets over the transport medium.

14. The storage system cluster of claim 13 wherein the transport medium comprises a SCSI transport.

15. The storage system cluster of claim 14 wherein the SCSI transport comprises iSCSI.

16. The storage system cluster of claim 13 wherein each of the first and the second storage systems further comprises a network driver operatively connected with the emulated protocol module.

17. The storage system cluster of claim 13 wherein the first and second storage systems are configured as storage appliances.

18. A method, comprising:
receiving an operation at a protocol emulation module of a first storage system;
emulating a protocol that supports a remote direct memory access operation at the protocol emulation module;
generating, by the protocol emulation module, a packet that is supported by a network adapter of the first storage system and a transport medium operatively connected to the network adapter that does not support remote direct memory access operations, the packet comprising the remote direct memory access operation;
sending the packet from the first storage system to a second storage system over the transport medium; and
implementing reliable reception of the packets over the transport medium.

19. The method of claim 18 wherein the transport medium comprises a SCSI transport.

20. The method of claim 19 wherein the SCSI transport comprises iSCSI.

21. The method of claim 18 wherein the packet comprises a data packet.

22. The method of claim 18 wherein the packet comprises a control packet.

23. A computer readable storage device containing executable program instructions executed by a processor, comprising:
program instructions that receive an operation at a protocol emulation module of a first storage system;
program instructions that emulate a protocol that supports a remote direct memory access operation at the protocol emulation module and further configured to implement reliable reception of the packets over the transport medium;
program instructions that generate a packet that is supported by a network adapter of the first storage system and a transport medium operatively connected to the network adapter that does not support remote direct memory access operations, the packet comprising the remote direct memory access operation; and
program instructions that send the packets from the first storage system to a second storage system over the transport medium, wherein the second storage system comprises a partner storage system.

24. An apparatus, comprising:
a memory including instructions for
receiving an operation at a protocol emulation module of a first storage system;
emulating a protocol that supports a remote direct memory access operation at the protocol emulation module;
generating, by the protocol emulation module, a packet that is supported by a network adapter of the first storage system and a transport medium operatively connected to the network adapter that does not support remote direct memory access operations, the packet comprising the remote direct memory access operation;
sending the packets from the first storage system to a second storage system over the transport medium; and
implementing reliable reception of the packets over the transport medium.

25. The apparatus of claim 24 wherein the transport medium comprises a SCSI transport.

26. The apparatus of claim 25 wherein the SCSI transport comprises iSCSI.

27. A method, comprising:
emulating a protocol that supports a remote direct memory access operation over a transport medium operatively connected to the first storage system that does not support remote direct memory access operations, the protocol emulated by a module configured to execute on a storage operating system of a first storage system;
generating by the module the remote direct memory access operation within packets that are supported by a network adapter of the first storage system and the transport medium;
connecting the first storage system to a second storage system using the transport medium;
receiving the packets from the first storage system by the second storage system using the transport medium;
performing the remote direct memory access operation within the received packets in response to a take over operation received by the first storage system;
is implementing reliable reception of the packets over the transport medium; and
generate a protocol packet that is supported by the network adapter and the transport medium.

28. The method of claim 27, further comprising providing the second storage system with a second module for emulating remote direct memory access functionality.

29. The method of claim 27, wherein the transport medium comprises an Ethernet connection.

30. The method of claim 27, wherein the transport medium comprises a SCSI transport.

31. The method of claim 30, wherein the SCSI transport comprises iSCSI.

32. The storage system cluster of claim 13 wherein the emulated protocol module is further configured to detect a missing sequence number of a set of sequence numbers assigned to the packets, the emulated protocol module further configured to, in response to detecting the missing sequence number, respond with a NACK message and ignore packets received over the transport medium until a received packet contains the missing sequence number.

33. The method of claim 18 further comprising:
detecting a missing sequence number of a set of sequence numbers assigned to the packets; and
in response to detecting the missing sequence number, responding with a NACK message and ignoring packets received over the transport medium until a received packet contains the missing sequence number.

34. The apparatus of claim 24 wherein the means for implementing reliable reception comprises:
means for detecting a missing sequence number of a set of sequence numbers assigned to the packets; and
means for responding, in response to detecting the missing sequence number, with a NACK message and means for ignoring packets received over the transport medium until a received packet contains the missing sequence number.

35. The method of claim 27 wherein implementing reliable reception comprises:
  detecting a missing sequence number of a set of sequence numbers assigned to the packets; and
  in response to detecting the missing sequence number, responding with a NACK message and ignoring packets received over the transport medium until a received packet contains the missing sequence number.

\* \* \* \* \*

UNITED STATES PATENT AND TRADEMARK OFFICE
CERTIFICATE OF CORRECTION

| | | |
|---|---|---|
| PATENT NO. | : 8,621,029 B1 | Page 1 of 1 |
| APPLICATION NO. | : 10/833405 | |
| DATED | : December 31, 2013 | |
| INVENTOR(S) | : James R. Grier | |

It is certified that error appears in the above-identified patent and that said Letters Patent is hereby corrected as shown below:

In the Specification:
Col. 3, line 16:
~~module of the storm age operating system manages a RDMA~~ should read
module of the storage operating system manages a RDMA In the Claims:
Claim 27, col. 16, line 34:
~~is implementing reliable reception of the packets over the~~ should read
and implementing reliable reception of the packets over the Signed and Sealed this
Third Day of June, 2014

Michelle K. Lee
*Deputy Director of the United States Patent and Trademark Office*